United States Patent
Sie et al.

(10) Patent No.: US 8,707,357 B1
(45) Date of Patent: Apr. 22, 2014

(54) THEMATIC VOD NAVIGATION

(75) Inventors: John J. Sie, Englewood, CO (US);
Gregory R. DePrez, Highlands Ranch, CO (US); John C. Beyler, Highlands Ranch, CO (US); Scott G. Barton, Lone Tree, CO (US)

(73) Assignee: Starz Entertainment, LLC, Englewood, CO (US)

( * ) Notice: Subject to any disclaimer, the term of this patent is extended or adjusted under 35 U.S.C. 154(b) by 2134 days.

(21) Appl. No.: 11/075,630

(22) Filed: Mar. 8, 2005

Related U.S. Application Data

(63) Continuation-in-part of application No. 10/393,724, filed on Mar. 18, 2003, and a continuation-in-part of application No. 10/128,653, filed on Apr. 22, 2002.

(60) Provisional application No. 60/551,477, filed on Mar. 8, 2004, provisional application No. 60/368,646, filed on Mar. 29, 2002, provisional application No. 60/285,817, filed on Apr. 23, 2001.

(51) Int. Cl.
*H04N 5/445* (2011.01)
*G06F 3/00* (2006.01)
*G06F 13/00* (2006.01)

(52) U.S. Cl.
USPC .................................. 725/38; 725/47; 725/51

(58) Field of Classification Search
None
See application file for complete search history.

(56) References Cited

U.S. PATENT DOCUMENTS

| | | |
|---|---|---|
| 5,001,554 A | 3/1991 | Johnson et al. |
| 5,130,792 A | 7/1992 | Tindell et al. |
| 5,191,573 A | 3/1993 | Hair |
| 5,357,276 A | 10/1994 | Banker et al. |
| 5,530,754 A | 6/1996 | Garfinkle |
| 5,534,941 A | 7/1996 | Sie et al. |
| 5,568,181 A | 10/1996 | Greenwood et al. |

(Continued)

FOREIGN PATENT DOCUMENTS

| | | |
|---|---|---|
| WO | WO 00/59217 A1 | 10/2000 |
| WO | WO 00/59220 A1 | 10/2000 |
| WO | WO 00/79798 A1 | 12/2000 |
| WO | WO 01/52543 A1 | 6/2001 |

OTHER PUBLICATIONS

Ciciora, Walter et al., "Modern Cable Television Technology: Video, Voice, and Data Communications," Morgan Kaufmann Publishers, Inc., Chapter 16, pp. 3 cover pages and 659-688, 1999.

(Continued)

*Primary Examiner* — Nathan Flynn
*Assistant Examiner* — James R Marandi
(74) *Attorney, Agent, or Firm* — Kilpatrick Townsend & Stockton LLP

(57) ABSTRACT

According to the invention, a method for allowing selection of video programs from a program guide presented to a viewer is disclosed. The video programs are selected from a program guide presented to a viewer. Selection of video programs is allowed from a program guide presented to a viewer. A program is presented with characterizing identifiers. A selection of the program is received by a viewer. It is determined that a viewer is likely switching away from the program or has activated a thematic link. A plurality of programs is determined. A search of the plurality of programs for one or more programs that have similar characterizing identifiers. The one or more programs are presented in a menu that is presented for the viewer.

14 Claims, 13 Drawing Sheets

(56) References Cited

U.S. PATENT DOCUMENTS

| | | |
|---|---|---|
| 5,583,561 A | 12/1996 | Baker et al. |
| 5,585,838 A | 12/1996 | Lawler et al. |
| 5,589,892 A | 12/1996 | Knee et al. |
| 5,604,528 A | 2/1997 | Edwards et al. |
| 5,610,653 A | 3/1997 | Abecassis |
| 5,619,247 A | 4/1997 | Russo |
| 5,619,249 A | 4/1997 | Billock et al. |
| 5,684,918 A | 11/1997 | Abecassis |
| 5,701,383 A | 12/1997 | Russo et al. |
| 5,724,646 A | 3/1998 | Ganek et al. |
| 5,774,664 A | 6/1998 | Hidary et al. |
| 5,805,154 A | 9/1998 | Brown |
| 5,822,530 A | 10/1998 | Brown |
| 5,850,218 A | 12/1998 | LaJoie et al. |
| 5,945,988 A | 8/1999 | Williams et al. |
| 5,973,683 A | 10/1999 | Cragun et al. |
| 5,977,964 A | 11/1999 | Williams et al. |
| 5,995,134 A | 11/1999 | Hayashi |
| 6,005,561 A | 12/1999 | Hawkins et al. |
| 6,049,333 A | 4/2000 | LaJoie et al. |
| 6,065,050 A | 5/2000 | DeMoney |
| RE36,801 E | 8/2000 | Logan et al. |
| 6,163,272 A | 12/2000 | Goode et al. |
| 6,163,316 A | 12/2000 | Killian |
| 6,166,730 A | 12/2000 | Goode et al. |
| 6,175,378 B1 | 1/2001 | Maillard |
| 6,177,931 B1 * | 1/2001 | Alexander et al. ............... 725/52 |
| 6,188,398 B1 | 2/2001 | Collins-Rector et al. |
| 6,209,024 B1 | 3/2001 | Armstrong et al. |
| 6,229,895 B1 | 5/2001 | Son et al. |
| 6,233,389 B1 | 5/2001 | Barton et al. |
| 6,233,607 B1 | 5/2001 | Taylor et al. |
| 6,240,553 B1 | 5/2001 | Son et al. |
| 6,253,375 B1 | 6/2001 | Gordon et al. |
| 6,266,481 B1 | 7/2001 | Lee et al. |
| 6,282,207 B1 | 8/2001 | Lerman et al. |
| 6,305,019 B1 | 10/2001 | Dyer et al. |
| 6,314,572 B1 | 11/2001 | LaRocca et al. |
| 6,314,573 B1 | 11/2001 | Gordon et al. |
| 6,314,575 B1 | 11/2001 | Billock et al. |
| 6,324,338 B1 | 11/2001 | Wood et al. |
| 6,446,261 B1 * | 9/2002 | Rosser ............................ 725/34 |
| 6,486,892 B1 | 11/2002 | Stern |
| 6,487,722 B1 | 11/2002 | Okura et al. |
| 6,532,589 B1 | 3/2003 | Proehl et al. |
| 6,571,390 B1 | 5/2003 | Dunn et al. |
| 6,601,237 B1 | 7/2003 | Ten Kate et al. |
| 6,637,029 B1 | 10/2003 | Maissel et al. |
| 6,698,020 B1 | 2/2004 | Zigmond et al. |
| 6,701,528 B1 | 3/2004 | Arsenault et al. |
| 6,725,303 B1 | 4/2004 | Hoguta et al. |
| 6,763,522 B1 * | 7/2004 | Kondo et al. .................... 725/39 |
| 6,802,077 B1 | 10/2004 | Schlarb |
| 6,865,746 B1 * | 3/2005 | Herrington et al. ............. 725/53 |
| 2001/0042246 A1 * | 11/2001 | Yuen et al. ....................... 725/1 |
| 2002/0026459 A1 | 2/2002 | Fernandez |
| 2002/0054752 A1 | 5/2002 | Wood et al. |
| 2002/0077880 A1 | 6/2002 | Gordon et al. |
| 2002/0120498 A1 | 8/2002 | Gordon et al. |
| 2002/0174438 A1 | 11/2002 | Cleary et al. |
| 2002/0178446 A1 | 11/2002 | Sie et al. |
| 2003/0005452 A1 | 1/2003 | Rodriguez |
| 2003/0020744 A1 | 1/2003 | Ellis et al. |
| 2003/0061610 A1 | 3/2003 | Errico |
| 2003/0067554 A1 | 4/2003 | Klarfeld et al. |
| 2003/0088872 A1 | 5/2003 | Maissel et al. |
| 2003/0101451 A1 | 5/2003 | Bentolila et al. |
| 2003/0188316 A1 | 10/2003 | DePrez |
| 2003/0233656 A1 | 12/2003 | Sie et al. |
| 2004/0117831 A1 | 6/2004 | Ellis et al. |
| 2005/0097599 A1 * | 5/2005 | Plotnick et al. ................. 725/32 |

OTHER PUBLICATIONS

Leibowitz, Dennis H., "Interactive TV: Turning Couch Potatoes Into Mouse Potatoes," Cable TV and New Media: Law & Finance, Media Law Publishing Corp., vol. XVIII, No. 1. 6 pages, Apr. 2000.

"Join Over 23,000 Key Decision-Makers in The Broadband Market Every Business Day," Broadband Week, downloaded from http://www.broadbandweek.com/news/020603/print/020603_content_one.htm, 3 pages, Jun. 3, 2002.

* cited by examiner

THEMATIC VOD NAVIGATION

This application claims the benefit of and is: (1) a non-provisional of U.S. Provisional Patent Application Ser. No. 60/551,477, filed on Mar. 8, 2004; (2) a continuation-in-part of U.S. patent application Ser. No. 10/128,653 filed on Apr. 22, 2002, which is a non-provisional of 60/285,817, filed Apr. 23, 2001; and (3) a continuation-in-part of U.S. patent application Ser. No. 10/393,724 filed on Mar. 18, 2003, which is a non-provisional of U.S. Provisional Patent Application Ser. No. 60/368,646, filed on Mar. 29, 2002; which are each incorporated by reference in their entireties for all purposes.

This application is related to U.S. patent application Ser. No. 11/079,450, filed on the same date as the present application, entitled "METHODS AND SYSTEMS FOR DISTRIBUTING ON DEMAND PROGRAMMING", which is incorporated by reference in its entirety for all purposes.

BACKGROUND OF THE DISCLOSURE

This disclosure relates in general to video distribution systems and, more specifically, but not by way of limitation, to consumer interfaces for video distribution systems.

Navigation within media players is difficult. Users often cannot understand on-demand services because of confusing interfaces. This confusion dampens adoption of modern video distribution services and decreases revenue because additional content is not ordered.

Personal video recorders (PVR) are giving users the ability to skip over marketing and advertising. The message from particular content providers and channels can be lost in the sheer number of offerings and the complexity of the equipment. Efficient use of the program guide enhances user experience and ultimately, revenue.

BRIEF DESCRIPTION OF THE DRAWINGS

The present disclosure is described in conjunction with the appended figures.

Figure 1:
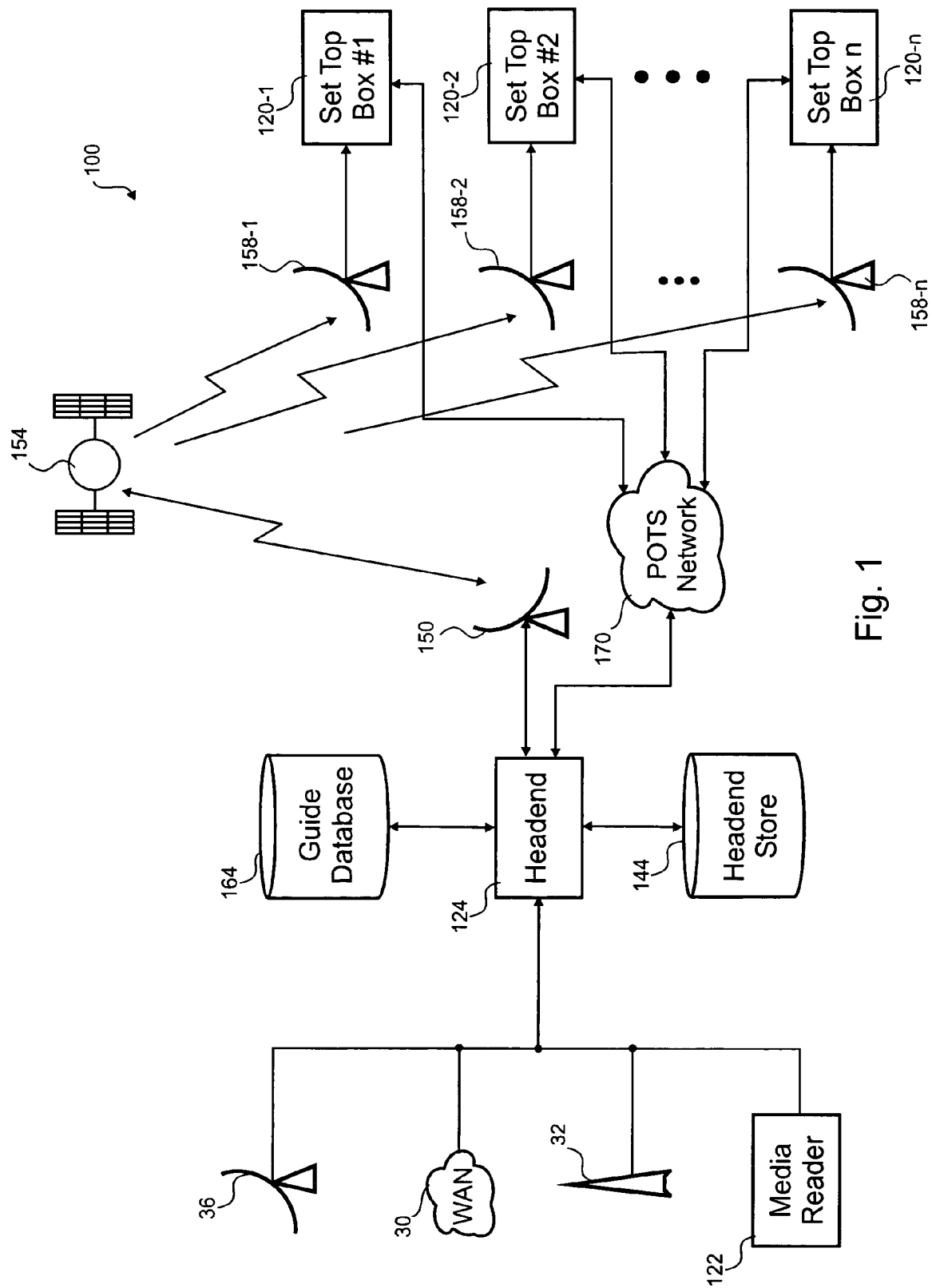
FIG. 1 is a block diagram, depicting an embodiment of a program delivery system using satellite transmission to each set top box.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE PREFERRED EMBODIMENT

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to, portable or fixed storage devices, optical storage devices, and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In one embodiment, this invention is designed to provide a thematic link appearing on the screen (e.g., TV, monitor, cell phone, personal video device, flat panel, goggles, or other viewing apparatus) in a linear television viewing channel. Activation of the thematic link provides a viewer with a thematic menu or list of program viewing choices available for on-demand viewing. The displayed on-demand selections are related to the linear viewing channel by one or more characteristics of the programming (e.g., theme, style, mood, brand of the linear channel, etc.). By activating the thematic link on the linear channel, the viewer causes a menu or list of related viewing options to appear which can be selected for on-demand viewing. This embodiment provides a viewing convenience benefit by giving a viewer access to programs that are related in some way to the linear channel they are watching.

In an embodiment, the thematic link works as follows: a viewer selects or tunes to a linear broadcast channel consisting of a series of programs displayed sequentially in time. This channel can be in a cable TV, satellite TV, VDSL, microwave, optical fiber, broadband, cell phone video channel, or streamed Internet video service. This channel has one or more distinct and identifiable themes to the programming it offers, or the programming may share a distinct and identifiable category, style, mood or audience appeal. The linear channel may have a name or brand or marketing activity which supports and reinforces this theme or category. In one example, the characterization for the linear channel is a genre, namely, westerns, and most programming on the linear channel is related to this genre in some way.

In some embodiments, the thematic link may not appear on the screen. For example, it could appear as a status indicator on the set top box, TV viewing controller, computer or television, or as a soft (i.e., programmable) button on a cell phone. Any mechanism could be used that indicates to the user that a related thematic menu is available.

In one embodiment, the thematic menu contents can change as does the program. A program could have a segment related to one topic and another related to another topic. For example, the program could be about famous directors where one part relates to one director and another to a different director. The thematic link could activate a menu related to the first or the second director based upon the one currently being described. Some programs have segments with different themes and activation of the thematic link during different themes could affect the contents of the thematic menu. For example, a movie may start out as a war story and change to a love story. Activation of the thematic link would bring up a menu consonant with the current theme.

When a viewer selects or tunes to the "themed" linear channel, there is a thematic link (message, icon, and/or symbol, which could be animated) that appears on the screen to indicate the availability of a selection of related on-demand programming in one embodiment. Some embodiments include a button on the TV viewing controller that can activate the thematic link, and may or may not also include a thematic link elsewhere. This link can appear on the channel when it is first selected or tuned, or the thematic link may appear when the viewer executes a function on a TV viewing controller. The link may stay on the channel for a short period of time, repeatedly, or indefinitely. Some embodiments have all available linear viewing channels "themed" or just a portion of the channels. A particular channel could be themed at one moment, but not the next. For example, during advertising one embodiment would not have a thematic link available, but it would re-enable after the commercial break. The thematic link in the advertising section could link to infomercials, special marketing offers or other marketing content related to the product being promoted or similar products.

These relationships between the linear program and on-demand content accessed by activating the thematic link could be defined in many different ways in the various embodiments. Examples include such theme categorizations as genre, style, mood, program length, content rating, language, reviewer ranking, availability of subtitles or closed captioning, actors, directors, studios, release year, first run or repeat, cost of the view, content provider category (pay programming, free program, network offerings, cable offerings, premium channel offerings, etc.), and/or other defining attributes. To illustrate this point, a viewer could be watching a network television sitcom from the linear schedule. By activating the thematic link, the defining attributes of the program would be analyzed against the programs available on-demand offerings to display a list or menu of related on-demand programs.

The thematic relationship could be refined and/or customized by the users of the video service. Different users could have different preferences and the set top box or equivalent could identify the current user to allow loading a particular user's preferences. Each user could rank the categorization criteria, or the set top box could observe the user's navigation to determine how to rank the criteria. Additionally, the user could map certain types of programs to a search query or ranked set of criteria. The user could specify what other types of programs would be searched for after watching a particular program or category of programs. For example, after watching the news on channel 9, the thematic menu could be configured by the user to display talk shows available on-demand. In some embodiments, the thematic menu could include other linearly scheduled programs in addition to or instead of on-demand programs.

When the thematic link appears, it indicates that the viewer can execute a function that will cause a thematic menu of related on-demand programs to appear after comparing the current program against those available on-demand (e.g., pay-per-view, VOD, subscription VOD, and/or near video on-demand). The viewer can execute the link function with a selectable button on screen and/or a button on the TV viewing controller. The selections on the thematic menu are consistent in theme with the linear channel and/or the program in one embodiment such that the viewer is presented with a selection of viewing choices that maintain the viewing characteristics of the linear channel and/or program (e.g., color scheme, fonts, branding, interface look-and-feel, features, etc.). The viewer can then make a selection of a program or sub-menu of programs, and begin on-demand viewing of a selected program. For example, some embodiments may have a thematic menu with individual programs and entries for submenus that would include additional programs.

In another embodiment, a program being broadcast on the linear channel is also available for on-demand viewing. In that case, there could be two icons or messages that appear or can be activated. The first link (e.g., button, link, message, icon, and/or symbol) would indicate that the current program in progress can be viewed immediately on-demand with temporal control of playback (e.g., pause, stop, fast forward, reverse, rewind, slow motion, fast playback, chapter skip, skip ahead/behind a time period, go to beginning/end, etc.). If the first link is selected, the program being viewed would instead be presented from an on-demand source. A second or thematic link would indicate that a thematic menu of related programs is available for selection. If the thematic link is selected, a thematic menu of programs would appear from which all on-demand viewing selections could be made, but the listing of all on-demand selections could be organized according to related or thematic characteristics.

In another embodiment, the first link could activate the thematic menu of related on-demand programs, and also activate another menu organized by category which in turn could have selections of on-demand programs available related to each of the other categories. The viewer could either: (1) select a related on-demand program, or (2) select a different category with an associated menu of on-demand programs. In this embodiment, the categories are organized in a manner related to the previous program being viewed before activating the link. The unrelated or less related categories would be available, but may require additional navigation.

In an embodiment of the invention, the viewer may not have the required subscription package or club membership or other qualification to be able to view some or all of the on-demand programs. These sorts of viewers would still get a thematic link or icon on the linear channel. When they activate the thematic link, they would be presented with on screen instructions describing the subscription package or club status required, along with an explanation of how to meet the qualifications to receive the on-demand programs. It might also be possible for the viewer to execute a function with a TV viewing controller (e.g., mouse, remote control, keyboard, tablet PC, PDA, voice command interface, etc.) that allows them to receive the on-demand programming, or some embodiments may have the customer make a phone call to get authorization.

In some embodiments, the thematic menu could differentiate between programs available without additional subscription and others that require additional subscription. The user may be able to specify that only subscribed content be shown in the thematic menu or to give priority to subscribed content, while displaying unsubscribed choices in the extra space. Additionally, different kinds of programs could be accentuated in different ways. For example, on-demand programs listing could be displayed using a different color than listings of programs in the linear schedule.

An example of an embodiment of this invention is that viewer tunes to a linear channel with a "romance" theme. A thematic link appears indicating that a menu of related programs is available for on-demand viewing. The viewer activates the message and the thematic menu appears, showing a list of programs with a "romance" theme. The viewer can select any program on the thematic menu for on-demand viewing, all of which maintain the "romance" theme.

In one embodiment, the thematic menu could include a list of thematic based or mood based on-demand titles based on the percentage similarities between the ratings and content advisories or other guide information. The linear program guide may have a set of ratings and content advisories associated within its guide data (i.e., MPAA or TV ratings, violence, language, sexual situations, etc.) associated with each program. By adding several new content information points to each title's guide data (i.e., genre, mood, content rating, etc.) combined with similar data within the on-demand metadata, a simple connection could be made to tie these titles together such that the thematic link would bring up similar titles. The content information points could be distributed with the other program guide information.

In one example, a linear program has romance and comedy indicators within its guide data. When the user activates the thematic link or otherwise selects the on-demand function from a program in the linear schedule, a search of all available on-demand content is performed. On-demand content with metadata that matches the guide data for the linear program is displayed on a menu in a prioritized manner with the highest percentage of a match being more prominent and more easily selected. In this example, it would be on-demand content that had romance and comedy associated with it. Other factors that could also be associated and compared would be actors, directors, ratings, type, movies, serialized series, soap opera, sitcom, miniseries, etc. as described more fully above. This would deliver to the user a list of on-demand titles with the greatest similarity to theme or mood of the current linear program.

Above embodiments contemplate switching from a linear program to a thematic menu, but in other embodiments any exit from a program (either linear or on-demand) could activate the thematic menu. Any action indicating a desire to pause or stop watching a program (e.g., pause, channel change, stop, skip to end, etc.) could activate the thematic menu. For example, while viewing a western sitcom on-demand, pausing or stopping the program could activate the thematic menu. There could be a delay before activating the thematic menu where a still of the program is displayed in the delay period. Further, the thematic menu could animate and change over time to indicate other possible related on-demand programs.

Some embodiments could make the thematic link appear in all types of video programs and not just those in the linear schedule. For example, while viewing an on-demand, pay per view, NVOD, VOD or SVOD program a thematic link would be displayed. Activation of the link would cause a thematic menu to appear with similar selections. The titles could be arranged by theme as above and/or could also organize other selections based upon format. For example, if an on-demand western genre movie were shown, the other westerns available on-demand would appear before the westerns available on other formats.

In one embodiment, the thematic menu could include linear programs. These linear programs could be currently playing, playing soon or playing later. The linear programs could be programs which are not currently offered on-demand. The viewer could select those playing now for immediate viewing or could select any current or future titles for recording. The viewer could ask that a reminder message be displayed when the future title is ready to begin.

In one embodiment, when a title is available by way of on-demand, pay per view, NVOD, VOD, or SVOD viewing, a flag would be automatically embedded in any copy of that title being broadcast for linear TV viewing, triggering the insertion of "Movie In Progress" or first link throughout program guide listings of that title. This automated process could be used in lieu of other processes to manage the continuous exchange of data between on-demand servers and on-screen guides. When the program is displayed in the program guide or is being viewed, the first link would indicate that the program could be viewed in at least one on-demand format. In some embodiments, the first link could show what on-demand format(s) (e.g., on-demand, pay per view, NVOD, VOD or SVOD) are possible by activating the first link. Some embodiments could have separate links for each possibility. Other embodiments could bring up a menu where there are multiple possibilities and the user could select the favored format. Pricing information could be available on this menu.

Figure 2:
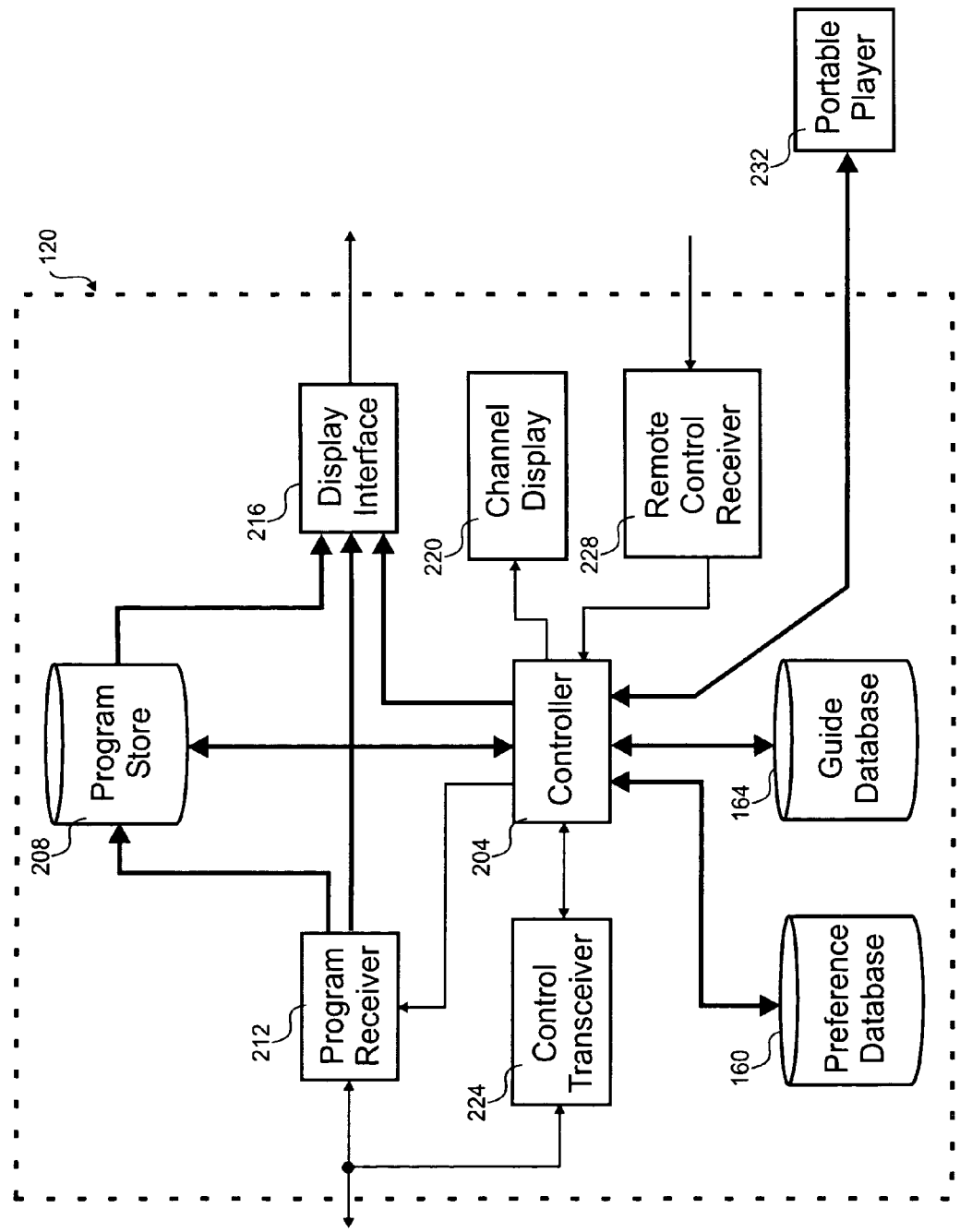
FIG. 2 is a block diagram illustrating an embodiment of a set top box that stores guide information, programs and preferences locally.

Referring first to FIG. 1, a block diagram is depicted of an embodiment of a program delivery system 100 using satellite transmission to each set top box 120. The content is relayed by satellite 154 to satellite receivers 158 respectively coupled to each set top box 120, but other embodiments could use wireless, HFC, optical fiber, VDSL, and/or power lines to distribute the content. This embodiment has a return data channel through the plain old telephone system (POTS) network 170, but other embodiments could use a WAN, the Internet, a satellite uplink, a cellular data network, a wireless network, HFC return path, etc. Each set top box 120 in this embodiment includes a guide and preference information and store for programs as shown in FIG. 2 as discussed below. Some legacy set top boxes could only include guide information without the ability to store programs or preference information.

A content provider (not shown) communicates via a satellite dish 36 with the program delivery system 100. Other embodiments could have content providers 130 that could also use a wide area network (WAN) 30, a terrestrial antenna 32, a media reader 122, and/or other distribution techniques. The WAN 30 could be a private or public network. Distribution on a public network, such as the Internet, could be protected by encryption and/or virtual private network (VPN) techniques. The terrestrial antennae 32 could accept content broadcast by local stations, sent by microwave link, or other wireless techniques. Any type of portable media could be read by various embodiments of the media reader 122. For example, a media reader 122 could read content from magnetic tape, film, optical disk, flash drives, hard drives, magnetic disks, holographic media, etc.

Some programs are relayed in real-time, while others are stored in a headend store 144 for later delivery. For example, a local network channel could be received on the terrestrial antennae 32 and coupled to the transmission system for immediate delivery to the set top boxes according to a linear schedule. Some programs could be held in the headend store 144 for viewing in a linear schedule, on demand and/or as a club program. In another embodiment, programs could be distributed to a neighborhood store for distribution according to a linear schedule, on demand and/or as a club program.

In one embodiment, a number of neighborhood stores could be distributed to neighborhood nodes in a larger metropolitan area such that there are sufficient singlecast channels between each neighborhood store and cluster of set top boxes 120. On a singlecast channel, the user can control playback of content residing on the neighborhood store. The programs could be video on demand (VOD), subscription video on demand (SVOD) club programs, network-based personal video recorder (NPVR) or programs from the linear schedule recorded for the user.

The guide database 164 has program descriptions, ratings, advertisements, schedule times, pricing, usage limits and promotional video and/or audio for the content available to the program delivery system 100. The guide database 164 could be populated by the content provider and/or a third party that gathers this type of information. Some embodiments could download relevant portions of the guide database 164 to each set top box 120 for browsing.

Also, a web site could show this information in addition to making it available through the set top box 120. Programs could be selected for recording and subscriptions (or other club memberships) could be ordered through the web site. One embodiment could formulate the guide screens with information from the guide database 164 for singlecast to a particular user or set top box 120. Program information for on demand offerings are also included in the guide database 164.

In some embodiments, the user is allowed to watch an on demand program during a time window. The guide database 164 could store time window information. Where a particular program is available in the linear schedule and on demand, the guide database 164 could be updated such that this is reflected on the menus for users who have these two formats available.

The guide database 164 further holds various theme categorizations such as genre, style, mood, program length, content rating, language, reviewer ranking, availability of subtitles or closed captioning, actors, directors, studios, release year, first run or repeat, cost of the view, content provider category (pay programming, free program, network offerings, cable offerings, premium channel offerings, etc.), and/or other defining attributes. These categorizations can be used when determining similar material to present to a viewer.

Referring next to FIG. 2, a block diagram illustrating an embodiment of a set top box 120 that stores guide information, programs and preferences locally is shown. This embodiment receives content and control information over a common conduit, such as an optical fiber, wireless antenna, satellite dish, power line carrier current modem, VDSL line, and/or coaxial cable. The set top box 120 in this embodiment has a program store 208 that uses a hard drive or other storage medium, such as an optical disk, flash memory, SRAM, removable disk, and/or magnetic tape. Included in the set top box 120 are a controller 204, a program store 208, a program receiver 212, a display interface 216, a channel display 220, a control transceiver 224, the preference database 160, and the guide database 164. In various embodiments, the set top box 120 could be combined with other equipment such as a television, a computer, a tuner, a home gateway, a digital music player, a personal video recorder, portable or mobile video device, etc.

The program receiver 212 tunes to one or more program streams to display and/or record them. With proper authorization, the program receiver 212 can tune to hidden channels to receive club programs that are not viewable before storage. The hidden channel could be an encrypted MPEG channel or an IP data delivery channel. In various embodiments, the hidden channel could use a terrestrial broadcast, cable television, DBS satellite, and/or other transport format.

Playback of live or recorded programs is done by the display interface 216, which is coupled to a monitor, plasma or LCD panel, projection system, or other display. The remote control receiver 228 receives keystrokes from a remote or other input device. Although some of the embodiments discuss the use of a remote control for activating certain functions, it is to be understood that other embodiments may include alternative methods for activating those functions. For example, voice activation, among other alternatives, may be used for such activation. The channel currently being played is shown on the channel display 220, which could also appear superimposed on the display.

The control transceiver 224 receives and sends control information. Information for the guide database 164 is received by the control transceiver 224 and could be customized by the delivery system 100 for a particular set top box 120 and/or user account. Information in the preference database 160 along with billing and other information is passed by the control receiver to the network node and/or headend 124. Programs could be passed through the control channel for storage in the program store 208 in addition to passing through the more typical path of the program receiver 212.

The program store 208 could be a video cassette recorder, a digital tape recorder, a hard drive, solid state storage, an optical drive, or other known storage media. The storage media could be removable or non-removable. The storage device could be external to the set top box 120 and coupled thereto with a dedicated cable, wireless transceiver, and/or packet switched network. In some embodiments, the program store 208 could be, for example, in a residential gateway, in another computer on the network, in a network storage device, or in a storage device peripheral coupled to the set top box 120. In one embodiment, programs are received in a compressed and/or encrypted format and stored on the program store 208. As or while the program is being played the compression and/or encryption is removed.

Recordings are stored in the program store 208. Typically, the program store 208 has a subset of programs available from the headend store 144. Club memberships, subscriptions, on-demand programs purchased, and time-shifted linear scheduled programs all can affect what could be held in the program store 208. DRM may be enforced by the controller 204 to regulate access to stored programs either on the set top box 120 or on a removable or separate store. Some embodiments allow offloading programs from the program store 208 in digital form for playing on other set top boxes 120, computers, DVD players, and/or portable media players.

Subsets of the guide database 164 relevant to the offloaded program(s) and the preference database 160 relevant to the user could be placed on the removable media or portable player to allow the guide customizations to flow to that portable device. For example, this embodiment includes a portable player 232 that could be connected to the set top box 120 with a cable, docking station or wireless interface. When coupled together, the preference database 160 and guide database 164 portions relevant to the portable player 232 could be loaded onto smaller versions of these databases within the portable player. The thematic link would be maintained on the portable player 232 using the selections currently available on the player, which would include stored programs and programs available for download or within a linear schedule of programs. Programs may be available on demand to the portable player 232 with a wired or wireless data port or may be available from broadcast via a satellite or terrestrial broadcast. The portable player 232 could be a personal video player, a wireless phone, a satellite radio, a car video system, etc.

The presentation of information from the set top box 120 can be customized for particular set top boxes 120, households and/or users. A preference database 160 stores customization parameters to facilitate the personalization of the set top box interface. The personalization can be per user, household or set top box 120 under the direction of the user. Information such as viewing habits, preferences, menu customizations, favorite shows, programs scheduled for recording, channel nicknames, parental controls, etc., can be stored in the preference database 160 for use by the program delivery system 100. For example, the program delivery system 100 can customize the menus singlecasted to a user based upon information in the preference database 160. The preference information can be passively gathered by tracking users and/or actively gathered by the user answering questions. The preference database 160 also stores information used to screen or filter which programs are made available or presented by the set top box.

Operation of the set top box 120 is managed by the controller 204 with use of supporting software and/or hardware. The guide database 164 and preference database 160 are used by the controller 204 to present menu screens and filter club programs for the users of the set top box 120. Some embodiments of the set top box 120 customize the user interface according to the user(s) interacting with the set top box 120. Biometric recognition, such as face recognition, voice recognition or keystroke recognition, could be used to determine the user. Alternative embodiments could augment or replace the automatic recognition with a screen prompt or a button on the remote. A button or switch on the remote could be assigned such that each user could indicate his or her presence. Once the identity of the viewer is known, the set top box 120 is actively or passively updates the preferences for the viewer in a multiple viewer household. Other embodiments could merely have a single set of preferences for all possible viewers and not try to resolve the particular viewer.

The guide database 164 holds program information for the programs available from the set top box 164. The stored information is typically a subset of that stored in the program delivery system 100. Tailoring of the guide database 164 could be influenced by preferences and subscribed services.

Figure 3:
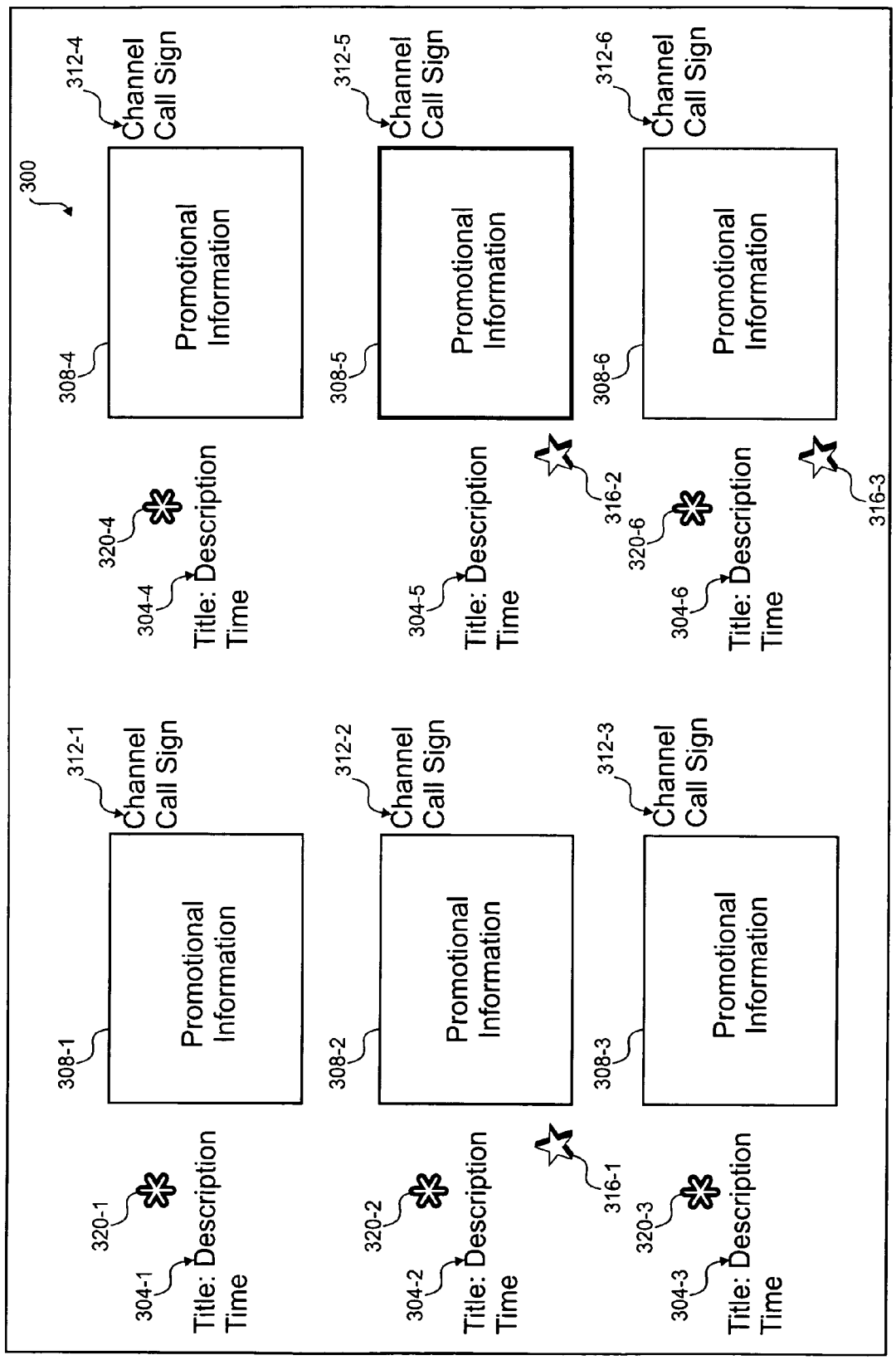
FIG. 3 is a screen shot depicting an embodiment of a thematic menu showing promotional information for a number of programs.

Referring next to FIG. 3, a screen shot depicting an embodiment of a thematic menu 300 showing promotional information 308 for a number of programs is shown. The thematic menu 300 could display the programs on the local program store 208, the SVOD selections available, the VOD selections available, on-demand programs, linearly scheduled programs, or a mix of these types of programs. Any thematic menu could be customized according to preferences for the user, the context of navigation and theme of most recent program. For example, the six depicted programs could be from channels the user specified in their profile or could be programs the set top box 120 has determined the user will enjoy. By viewing the thematic menu 300 with the six program zones of this embodiment, the user can quickly determine a program to play.

Using keys on the remote, for example, the user can move the focus to the promotional information area 308-5, which could be highlighted. The promotional information could include a video clip, a video clip with audio accompaniment, an audio clip, a still image with audio accompaniment, an animation, an animation with audio accompaniment, a still image, bonus material, director commentary, a plurality of still images, and/or a plurality of still images with audio accompaniment. When a particular zone is in focus, any sound for that image could be played while the sound for the other images could be muted. Further, moving focus to a particular zone may highlight that promotional information 308 and provide enhanced summary information 304 for that program. For example, a larger version of the image 308 could be displayed when that zone is in focus. In some embodiments, the image 308 may switch between two possibilities when that zone is in focus. For example, a static image could be shown until that zone is brought into focus whereafter a moving image or animation is presented.

By pressing a button on the remote while focus is on a particular image 308 or zone, the corresponding program can be played or downloaded for later playback. A menu page or menu overlay may be activated by that button to allow playing a program, subscribing to a club or subscription service for that program, authorizing a one-time fee to view the program, playing or deleting a stored program, etc. In some embodiments, moving focus to a particular zone presents buttons on the thematic menu screen corresponding to some of these options in lieu of a separate menu page or menu overlay.

The promotional information 308 and/or program descriptions 304 may be made general to a number of programs. For example, a clip 308 for a series of programs could be reused for each program in the series where the program descriptions 304 could change for each episode. In some embodiments, there may be default promotional information 308 and/or program descriptions 304 for a particular channel such that if no specific information were provided the default promotional information 308 and/or program descriptions 304 could describe the particular channel.

The six zones of the thematic menu 300 each describe a particular program with summary information 304, promotional information 308, and content provider information 312. The program could be an audio or video program. Summary information 304 is provided for each program and includes: a title, a description, a program length, a start time for programs in the linear schedule, actors, a content advisory rating, a reviewers rating, and/or other information.

Each zone has promotional information 308 which could be a static or dynamic image, such as a picture, advertisement, video clip, audio clip, slide show of images, animated image, etc. This promotional information 308 is stored in the local program request database 604 for this embodiment, but could be stored remote to the user location in other embodiments. Where the program associated with the zone is a currently playing program, a live view of that program could be displayed. Where there are not enough tuning resources to dedicate a tuner for each currently playing program, the tuner resources could cycle through the images of the live programs such that each flashes a static image or small clip before the tuner resource is switched to the next zone.

Each zone also has content provider information 312. In this embodiment, the content provider information includes a channel and call sign associated with the content provider, but could also include a logo, a language, a nationality, etc. Where all zones are associated with a particular channel, the content provider information 312 could be removed. Some zones in the depicted embodiment of the thematic menu 300 further include a notification symbol 316. A notification symbol 316 indicates that the program associated with that zone is immediately available for playback with full or partial control of the playback. Those without the symbol are part of the linear schedule and can be watched while the program is broadcast, but are not currently stored so as to allow rewinding, etc. The notification symbol 316 could have a number of variants to indicate the type of program (e.g., stored program, SVOD or club program, VOD program), limited availability of the program, a charge is associated with viewing the program, the content provider associated with the program, etc. The notification symbol can be a static icon or an animated icon in various embodiments.

Some programs show a thematic link 320 in their zone. The thematic link allows finding programs similar to the program in that zone. A theme, channel and/or content provider can be used in a further search for programs after activation of the thematic link 320. For some programs, such as the program associated with zone five, a thematic link 320 is not available. A particular channel or content provider may elect to not provide a thematic link 320 or insufficient information is available to determine a list of alternative programs such that a thematic link 320 would not appear.

Figure 4:
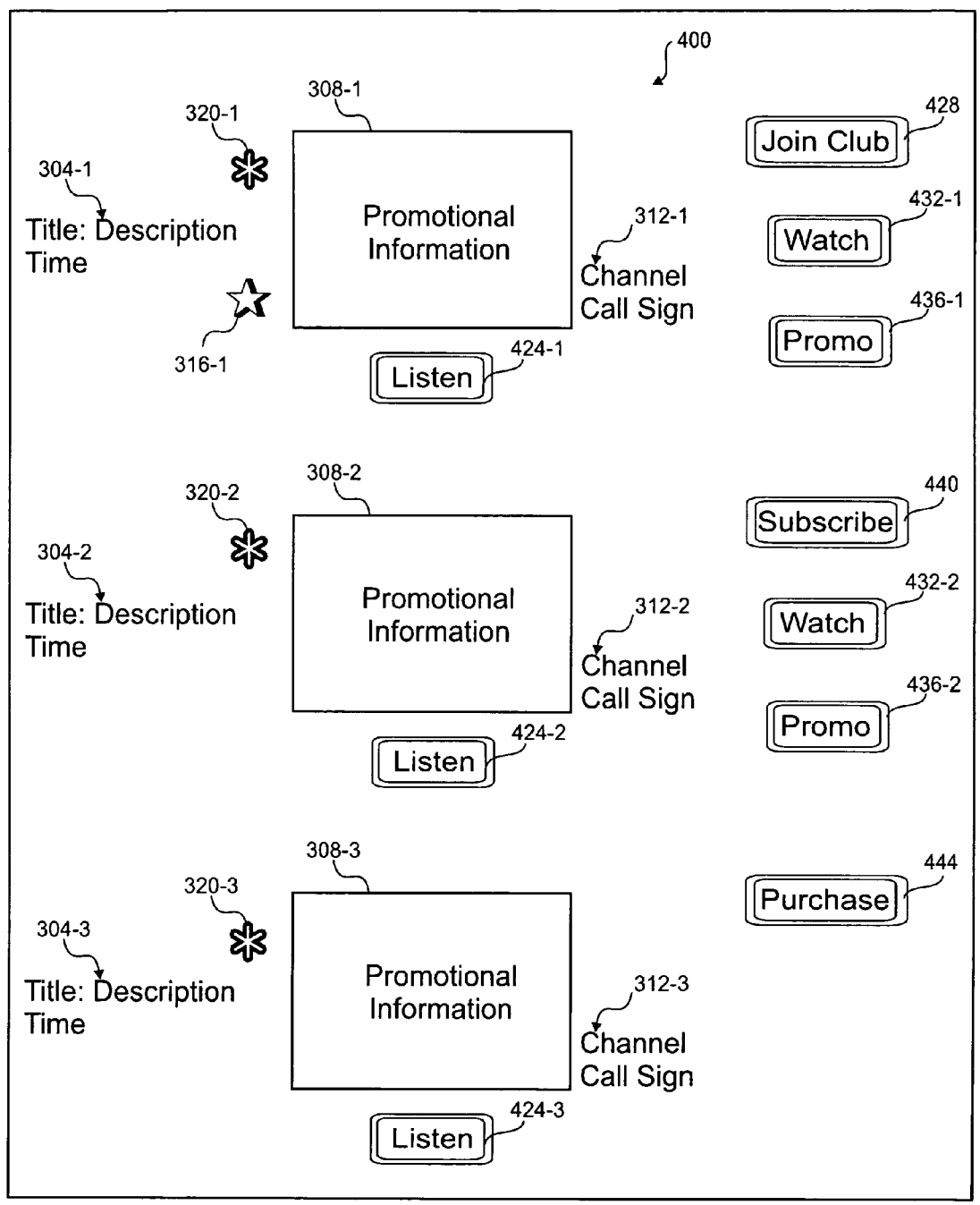
FIG. 4 is a screen shot illustrating another embodiment of a thematic menu with promotional information.

Referring next to FIG. 4, a screen shot illustrating another embodiment of a thematic menu 400 with promotional information 308 is shown where the user has several options for playing the promotional information 308. This embodiment has three zones respectively associated with three programs. Virtual buttons are provided on the screen to perform certain actions. Cursor keys, a mouse, touch screen input or the like are used to focus and select the buttons.

In the top zone, a SVOD program is showcased as indicated by the notification symbol 316-1. The SVOD program appears in both the linear schedule and has a stored version that can be played anytime with full control of playback. The first promotional information 308-1 could be of the program being played or could be of a promo associated with the program. The live program is played by activating the "watch" button 432 when the live program is currently playing. A "listen" button 424 allows activating audio for particular program information 308, which automatically deactivates any audio being played for other zones. Where the live program is not currently playing, the "watch" and "promo" buttons 432, 436 disappear and the promo clip is played. If the user is not a club member, a "join club" button 428 is displayed such that the user can request club membership to allow playing the program.

A live program from a premium content provider is shown in the middle zone. Premium content providers typically require a subscription to view their programs. In this embodiment, a "subscribe" button 440 is displayed for non-subscribing users to begin the process of becoming a subscriber. The "watch" button 432 and "promo" button 436 allow switching the second promotional information 308-2 between live playback of the program and a promo clip of the program. For non-subscribers, the live playback may be crippled in some way by limiting the time the user can watch the live show to a small period, such as five seconds; showing a slide show of frames separated in the program by some interval, such as one second; showing a reduced resolution version of the live program; showing a black-and-white version of the show; showing the show without sound; etc.

A bottom zone of the thematic menu 400 relates to a VOD offering that is stored and can be played with full control of playback. The third promotional information 308-3 shows a promotional clip of the program shown in a loop. In other embodiments, the third promotional information 308-3 could be a static image until focus is changed to the third zone, whereby a promotional clip replaces the promotional information 308-3. A "purchase" button 444 begins a process whereby the user can buy a viewing of the program. After the purchase, the user may be given a window in which the program is available for viewing with control of playback, such as a one-day period, before another purchase would be required for further viewing. In some embodiments, the period could be a week, a month, a year, or an indefinite period. Instead of a "purchase" button 444, one embodiment could have a download button that would load the selection onto the program store 208.

Figure 5:
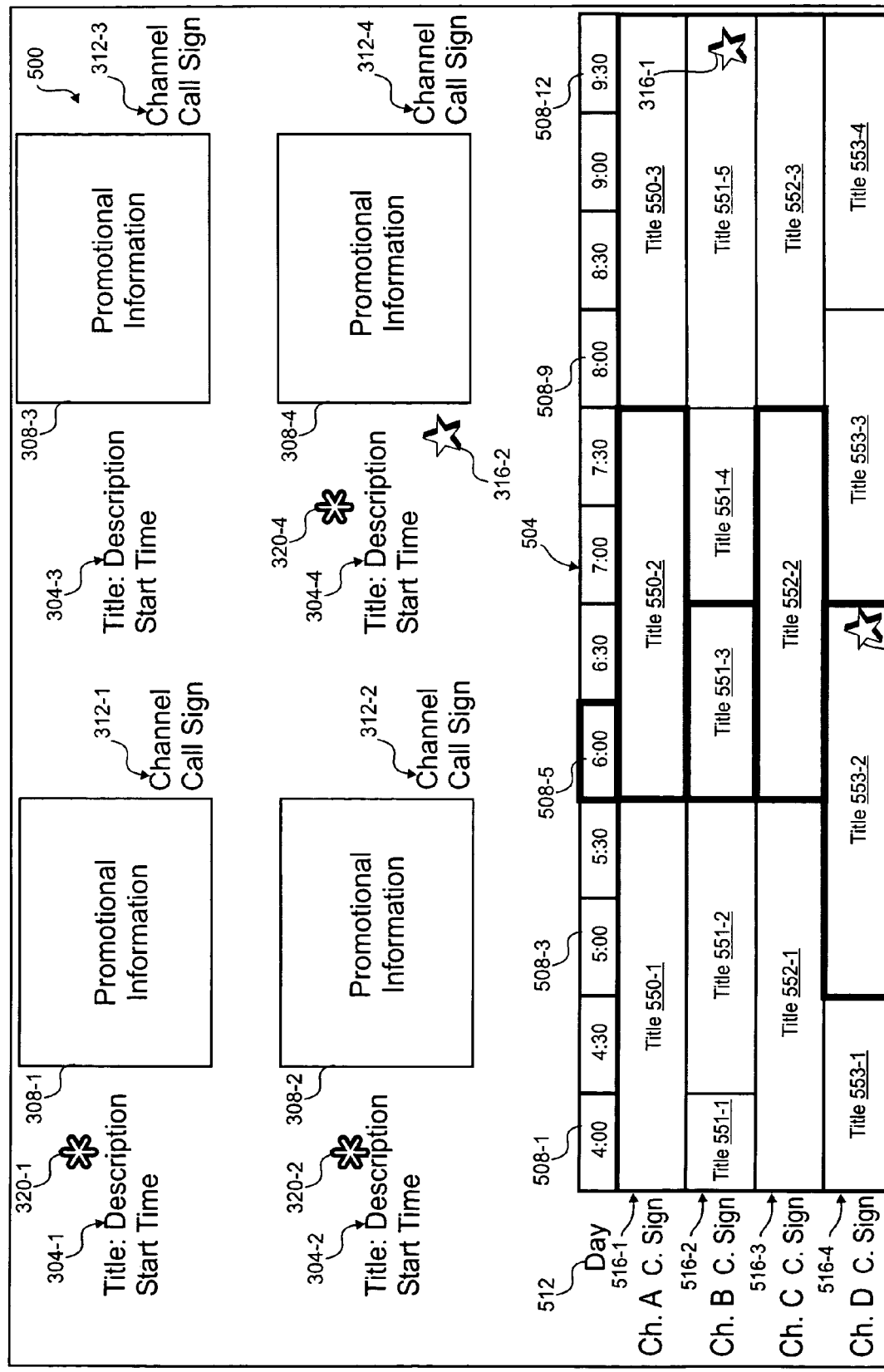
FIG. 5 is a screen shot illustrating yet another embodiment of the thematic menu that shows a linear schedule of programs.

With reference to FIG. 5, a screen shot illustrating another embodiment of the thematic menu 500 shows a linear schedule of programs 504 where a column of programs can be selected for further information. Where a time column is selected, all the programs playing during that time are detailed in the top portion of the thematic menu 500 with promotional information 308, description information 304 and content provider information 312. In this embodiment, four channels 516 are displayed in the bottom portion of the thematic menu 500 with four detailed programs in the top portion of the thematic menu 500. Using the remote, the user may increase the number programs detailed in the top portion and the number of channels displayed in the thematic menu 500.

This embodiment allows selecting a whole column of programs for more detailed information. Other embodiments could also allow selecting a row of programs for more detailed information such that a sequential number of programs for a given channel 516 is displayed. For example, Channel A 516-1 could be selected by focusing on the call sign. This would detail three programs in the top half of the thematic menu. Since the top half of the thematic menu screen could show one, two, four, six, eight programs easily, selecting a channel with a number of programs between that value could increase the number of detailed programs appropriately. For example, selecting Channel B 516-2 could detail six programs in the top half of the thematic menu 500 by pulling the program that starts at 10:00 such that six programs could be detailed at once.

The channels displayed in the thematic menu 500 are chosen by the set top box 120 or video player. These channels can also be ordered. The most recently watched program, channel and/or content provider along with any user preferences influences what is displayed in the thematic menu 500.

Figure 6:
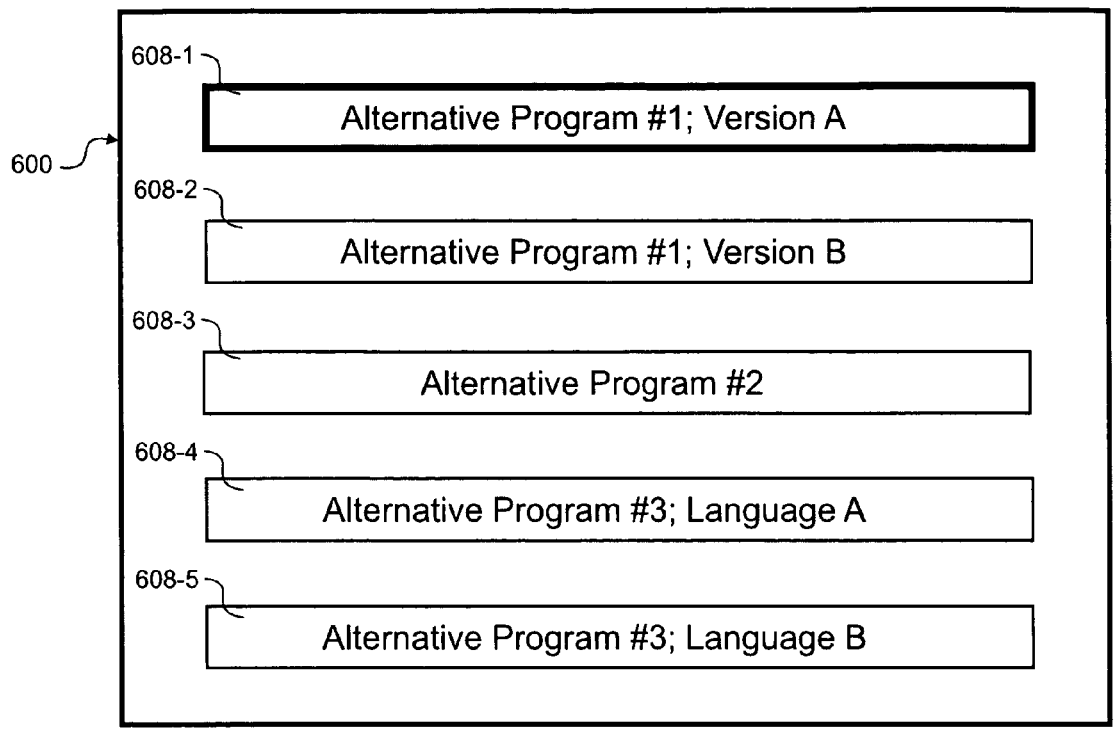
FIG. 6 is a screen shot illustrating still another embodiment of a thematic menu prompting for further interaction with a particular content provider, channel, service, or theme.

With reference to FIG. 6, a screen shot illustrating an embodiment of a thematic menu 600 prompting for further interaction with a particular content provider, channel, service, or theme is shown. The content provider is the entity that brands one or more channels, for example STARZ!™ and Black STARZ!™ are two channels offered by Starz Entertainment Group™, the content provider. A channel is a conduit of programs distributed according to a linear schedule. A service is an on-demand, VOD, SVOD, PVR service, club or other subscription of programs that can be viewed with full control over playback. A theme is any common attribute that can be defined for programs based upon information the program guide database 160, for example, genre, style, mood, program length, content rating, language, reviewer ranking, availability of subtitles or closed captioning, actors, directors, studios, release year, first run or repeat, cost of the view, content provider category (pay programming, free program, network offerings, cable offerings, premium channel offerings, etc.), and/or other defining attributes. Some embodiments could further customize the thematic menu 600 with preferences from the user that are manually or automatically gathered.

This embodiment shows five selections 608 featuring three programs, two of which have alternate offerings. For example, the first selection 608-1 is for a first alternative program in a wide screen version, and the second selection 608-2 is for the first alternative program in a 4:3 aspect ratio. Some selections 608 could be for the same program in different languages, different subtitles, different content ratings, director cuts, alternative endings, with commentary, etc.

Figure 7:
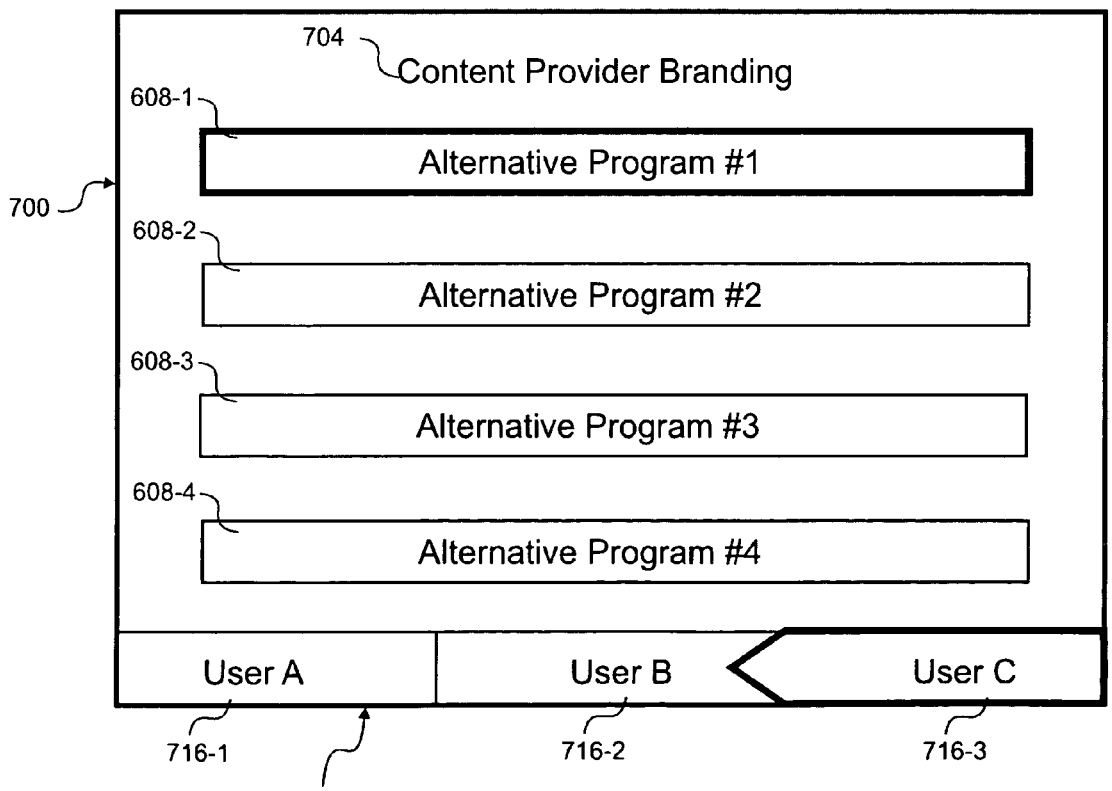
FIG. 7 is a screen shot illustrating another embodiment of a thematic menu prompting for further interaction with a particular content provider by a recognized user from a group of possible users.

Referring next to FIG. 7, a screen shot illustrating another embodiment of a thematic menu 700 prompting for further interaction with a particular content provider is shown. In this embodiment, four alternative programs are suggested for the user from a listed content provider 704. The alternatives 608 can be associated with the content provider, a theme and/or a channel in various embodiments. The set top box 120 determines the user viewing the exited program. Possible programs are compiled and culled down based upon the profile of the user.

The culled list of programs is displayed along with a user confirmation footer 712. This embodiment of the footer 712 lists three configured users, but more could be listed in a rotating carousel menu. The bolded User C 716-3 is listed as the likely viewer, but that guess by the set top box 120 can be corrected using the remote, for example. If the actual viewer corrects the determined viewer, the culled list would be reformulated based upon the actual viewer's preferences. The determined viewer is found using biometric vision sensor, a remote control interaction algorithm or some other automated recognition method. Some embodiments could display more information on the programs in a manner similar to that of the embodiments in FIGS. 3, 4 and 5.

Figure 8A:
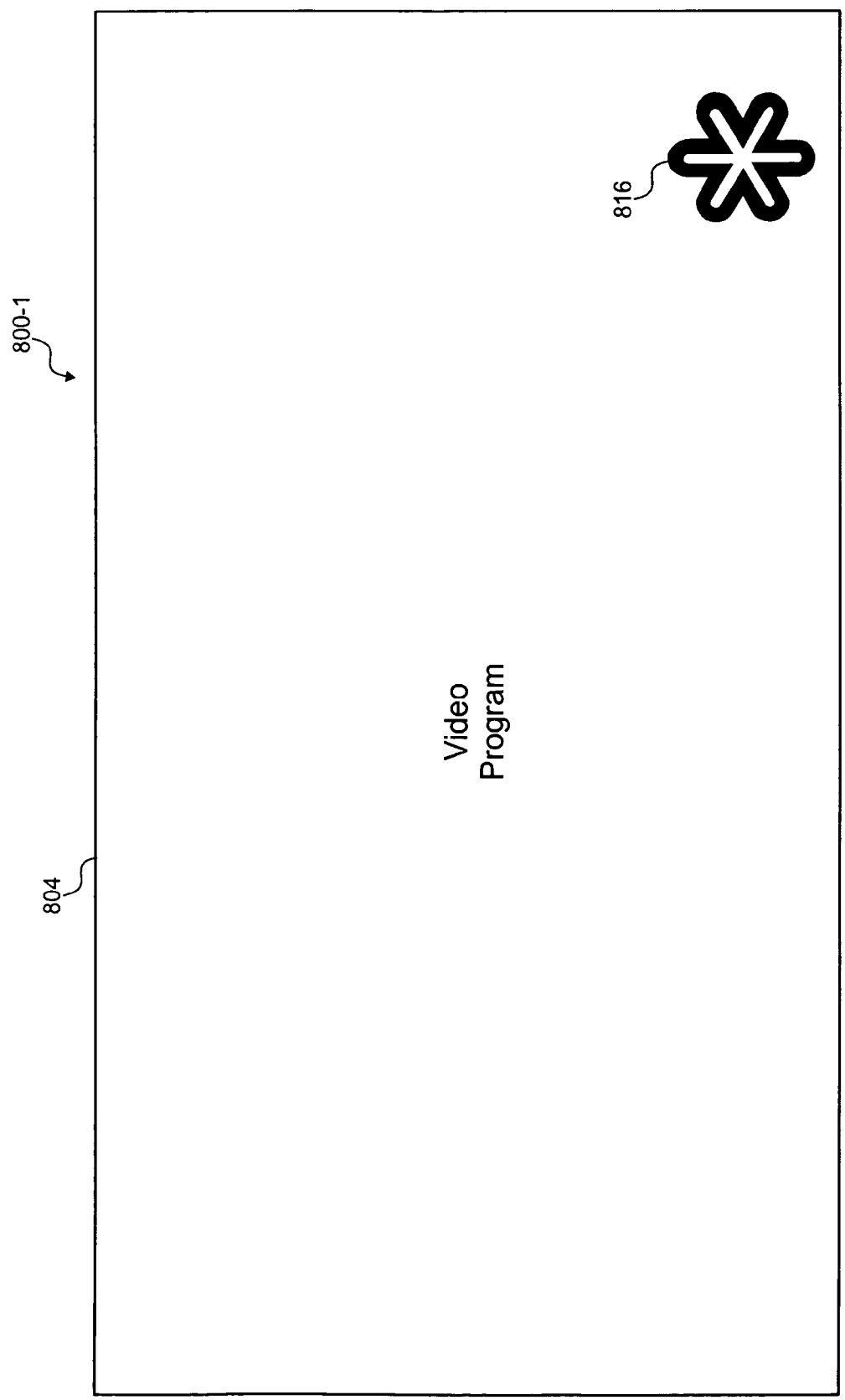
FIGS. 8A and 8B are screen shots illustrating embodiments of a video program being played with and without a thematic menu.

Referring next to FIG. 8A, a screen shot 800-1 illustrating an embodiment of a video program 804 is being played. A thematic link 816 is shown on the screen. The link 816 could be a static or animated icon, for example, a channel or content provider bug could be the thematic link 816. Where the thematic link 816 is the only selectable thing on-screen, it is in the focus of the program guide. Activating a select button on the remote, for example, would bring-up a thematic menu of some sort. Other embodiments could have a dedicated button on the remote control to bring-up a thematic menu that is influenced, by the theme, channel, and/or content provider.

Figure 8B:
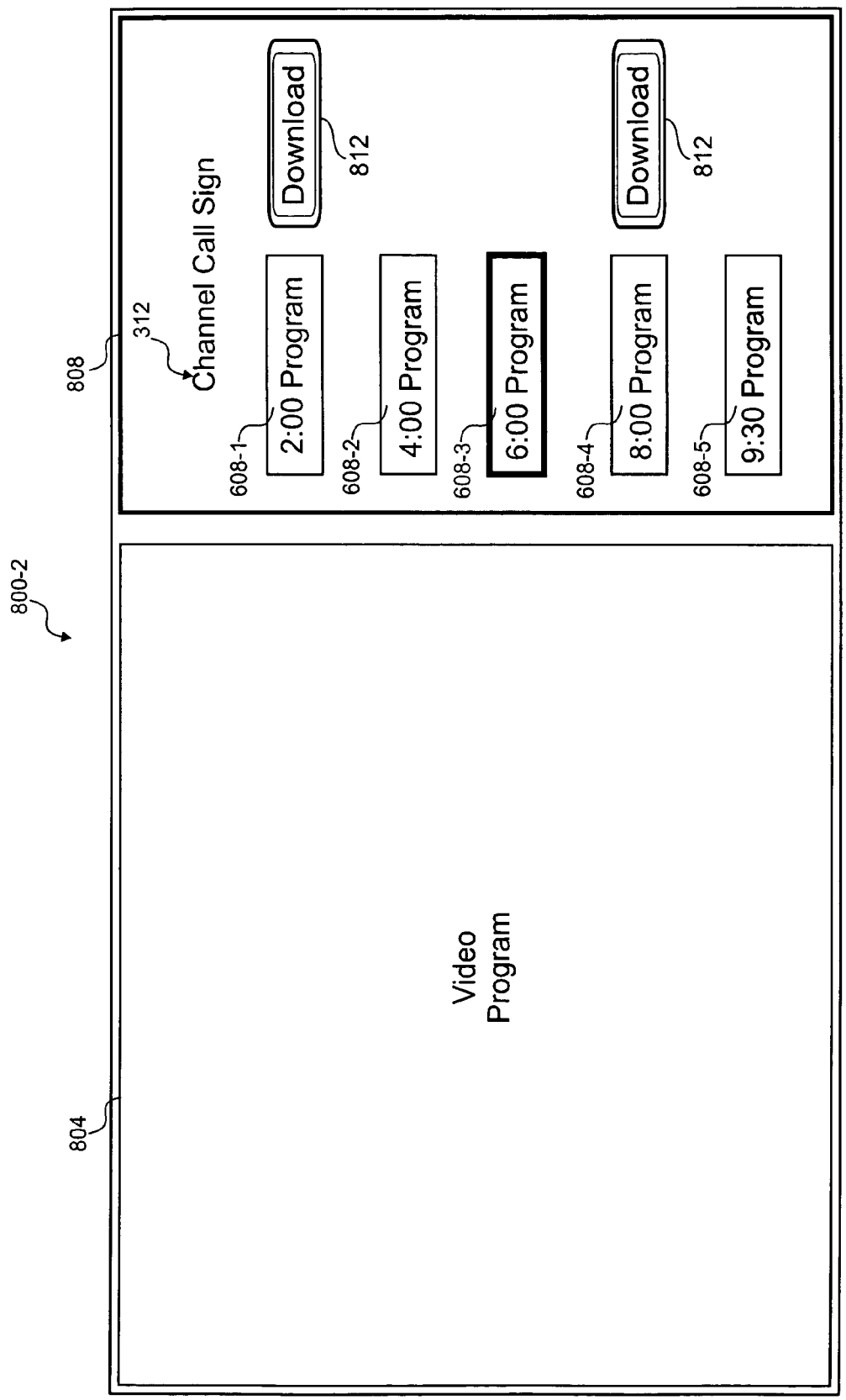

With reference to FIG. 8B, a screen shot 800-2 illustrating an embodiment of a video program 804 and a thematic menu 808 prompting for further interaction with a particular channel is shown. The video program 804 is currently playing back and is associated with a channel noted with a call sign 312. The video program 804 may or may not have its playback controllable by the viewer. The thematic menu 808 shows a number of selections in a linear schedule that shows playback times. By activating a selection 608 the playback point can be moved backward in time (or forward in some embodiments). Some programs can be selected for download 812 onto the program store 208. The downloading may start immediately or at some later time.

The thematic menu 808 may only appear when there is triggering event, unless the user manually calls-up the thematic menu 808 using a thematic link 816. A triggering event includes stopping the program, pausing the program, switching to a new channel, program unavailability (dropped signal, insufficient digital rights, or any other error), during fast or slow playback, during commercial breaks, as a screen saver, during the credits, or during commercial skipping.

Figure 9A:
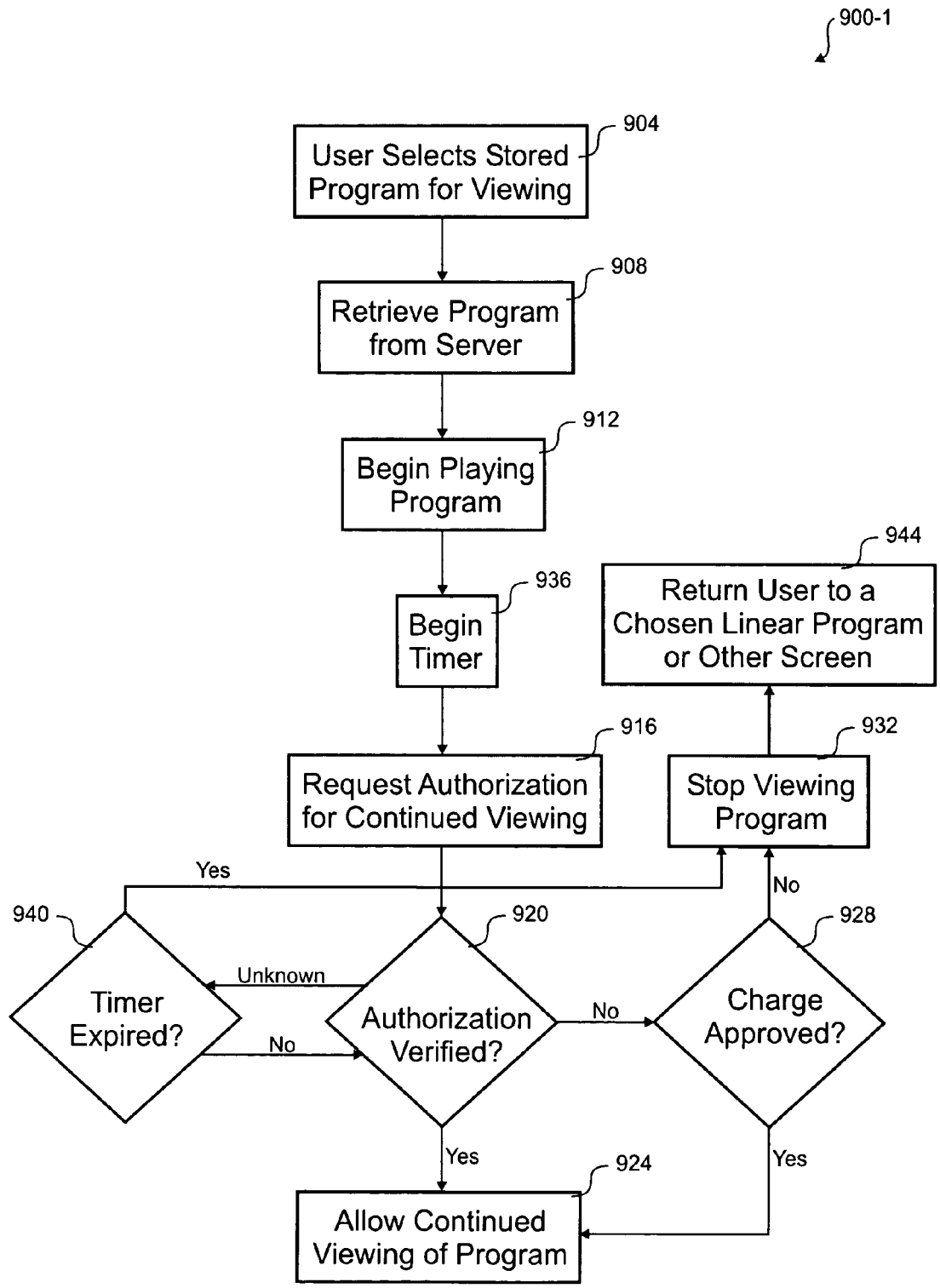
FIGS. 9A and 9B are flow diagrams of embodiments of a process for verifying authorized playback of a stored program.

With reference to FIG. 9A, a flow diagram of another embodiment of a process 900-1 for verifying authorized playback of a stored program is shown that leaves unauthorized users viewing a chosen program in the linear schedule or a thematic menu. Not being authorized is the triggering event that causes display of the thematic menu. The user has the ability to request viewing of any stored program and chooses one in step 904. The program is spooled or otherwise received in step 908 from the headend store 144. In various embodiments, the program could be delivered with MPEG-2 transport, packet switched protocols, wireless transport, or circuit switched transport. Once the portion requested by the user is received, the playback can begin. The start of playback is not impeded by the latency associated with determining if the user is authorized to view the program such that the program begins play in step 912.

In step 936, a timer is started. Even if unauthorized, a free viewing can be enjoyed until the timer expires. Authorization for continued viewing is performed in step 916. In step 916, authorization is requested for continued viewing of the program. Other embodiments could perform step 916 at any point after step 904, but playback is not conditioned upon an answer to the authorization request. In step 920, the authorization could be verified by querying a database away from the user location in the headend 124, a neighborhood node or elsewhere. In some embodiments, the authorization could be stored in a database local to the user location.

While waiting for continued viewing to be authorized in step 920, the timer may expire in step 940, which causes viewing of the program to cease in step 932. The user can be sent to a predetermined channel in the linear schedule or another screen, for example, a thematic menu in step 944. For example, the user may be redirected to the current club offering in the linear schedule where the user tried to watch a program in the club that wasn't authorized. In another example, the user could be redirected to a thematic menu for purchasing single views or an advertisement for some other goods and/or service. The suggested alternative programs or categories of programs could be customized according to the profile of the current user or a theme related to the previously viewed program. Examples of the thematic menus presented are explained in relation to FIGS. 3-7 and 8B. This embodiment creates an opportunity to further interact with the user before they divert their attention to other programs perhaps associated with a different content provider or channel.

Where authorization is verified in step 920, continued viewing is allowed in step 924. Some embodiments may have a timer that allows viewing for up to ten seconds before preventing further viewing where the authorization request is not responded to in that period.

Where authorization cannot be verified in this embodiment, processing continues to step 928 where the user is asked to authorize a charge for the program or asked to join a membership club that would allow viewing of one or more programs. Where the user approves the continued viewing, processing continues to step 924 where that viewing is allowed to occur. If the charge or club membership is not approved, further viewing of the program is prevented in this embodiment. The status of the authorization may be retained in the set top box 120 to prevent any further viewing of the program. Although the above embodiment uses video programs, other embodiments could use audio programs delivered through satellite, VDSL or a cable TV plant. Other embodiments could deliver video games to the set top box 120 in this manner also.

Although this embodiment suggests alternatives or other advertisements when authorization is denied, other embodiments could trigger this advertisement at other times. For example, advertisement could appear when the program is stopped or paused, when there is any delay in performing a function, when the input signal is unavailable, etc. These advertisements could attempt to up-sell the user to other products offered by the content provider or could provide advertisements that are not associated with the content provider.

Figure 9B:
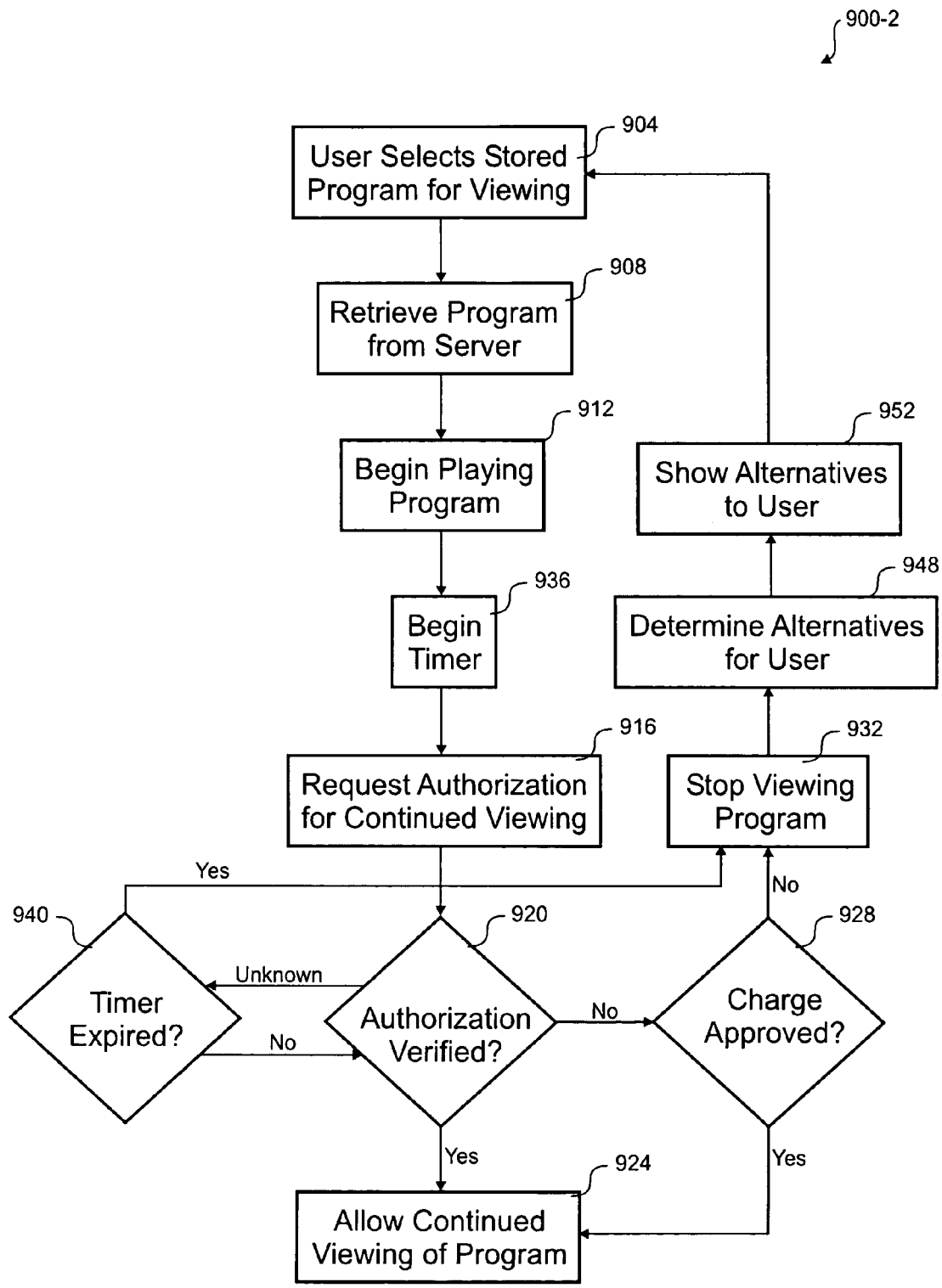

Referring next to FIG. 9B, a flow diagram of yet another embodiment of a process 900-2 for verifying authorized playback of a stored program is shown where alternatives may be suggested. This embodiment is similar to that of FIG. 9A, but additional steps 948 and 952 replace step 944 to suggest alternative programs. Stopping of the view, failure of authorization or a rejected charge result in determining of alternative programs in step 948. The attributes of the current program, the content provider, channel and/or user preferences can be taken into account when determining the alternatives. A thematic menu of alternatives is displayed to the user in step 952. By looping back to step 904 after step 952, the user can select one of the suggestions to begin the process again. In another embodiment, the suggested programs that are known to be not authorized from step 920 could be removed from the list. Some of the remaining suggestions could be members of different clubs and require further authorization.

Figure 10A:
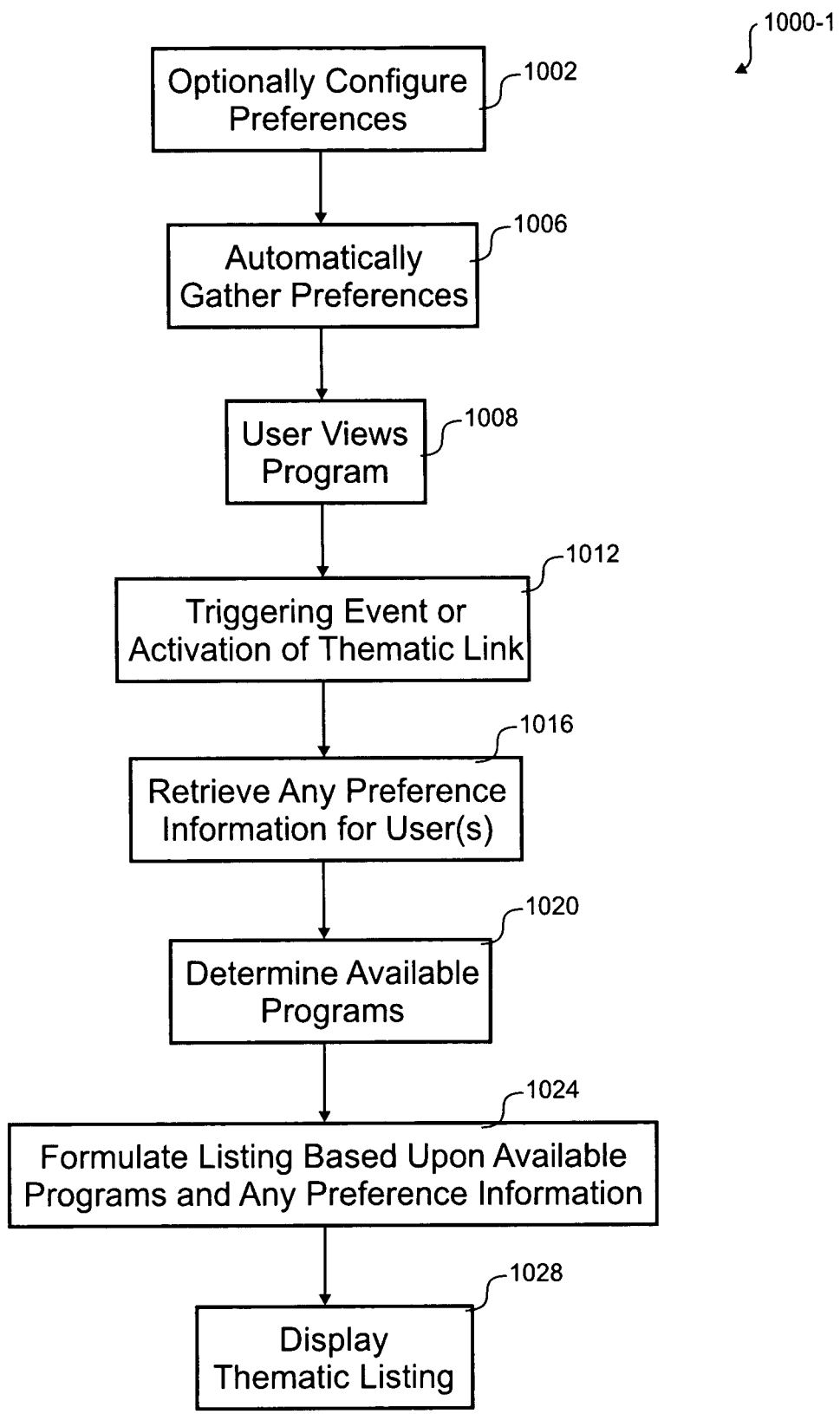
FIGS. 10A, 10B and 10C are flow diagrams of embodiments of a process for presenting a thematic menu after a triggering event.

Referring next to FIG. 10A, an embodiment 1000-1 of a flow diagram is shown that presents a thematic menu after a triggering event. The depicted portion of the process begins in step 1002 where the viewer(s) optionally configure preferences. The viewer can specify the types of programs, genre, actors, directors, production companies, content providers, formats, channels that the viewer prefers to watch. Different profiles can be entered for different viewers. Where the viewer has not configured preferences, they can be gathered automatically in step 1006. Some embodiments allow the manually entered preferences to change overtime with automatically gathered information, even though this embodiment sticks with manual preferences when they are specified.

In step 1008, the user views a program. At some later time, a triggering event occurs or the user manually activates a thematic link in step 1012. Manually entered and automatically gathered preference information is retrieved in step 1016 from the preference database 160. The programs available to the viewer are determined in step 1020. This embodiment selects from all possible programs regardless of content provider or channel. Steps 1016 and 1020 can be performed in any order. Some embodiments make available both authorized and unauthorized programs. Selection of an unauthorized program would result in an upsell to that tier or club.

In step 1024, the thematic menu contents are determined. Selections are displayed in step 1028 according to relevance, cost, length, genre, rating, or any other criterion. A given menu may only be able to see a fraction of the possible programs, but the viewer can navigate deeper into the menu to get at other possible offerings.

Figure 10B:
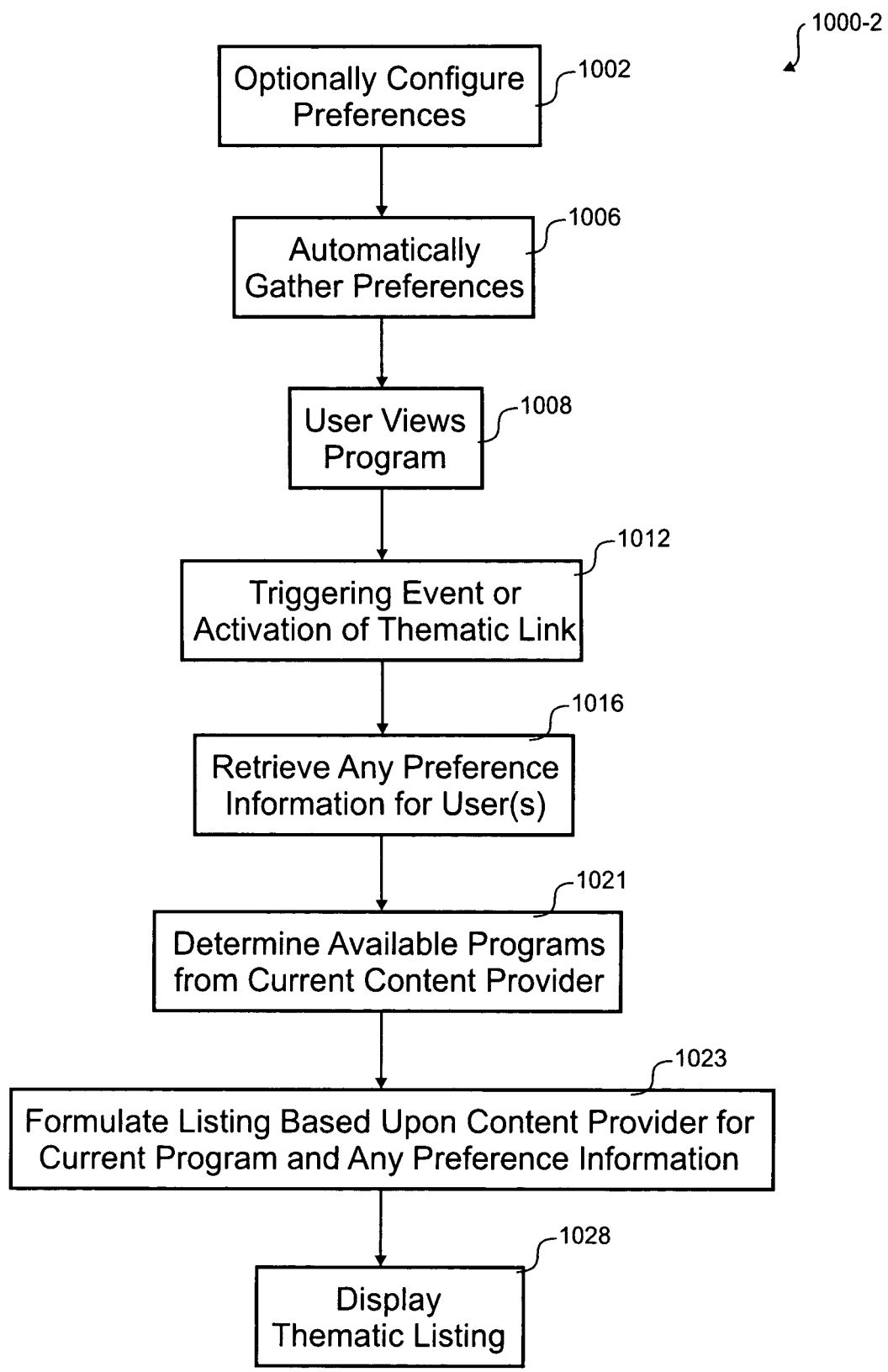

With reference to FIG. 10B, another embodiment 1000-2 of the flow diagram is shown that presents a thematic menu after a triggering event is shown. This embodiment differs from that of FIG. 10A by exchanging steps 1020 and 1024 for steps 1021 and 1023. In step 1021, the available programs from the current content provider is displayed and not that of other content providers. Some embodiments could preference programs from the current content provider and de-emphasize the programs from others. In step 1023, the listing of programs in this embodiment is determined based upon the current content provider and any preference information before display in step 1028.

Figure 10C:
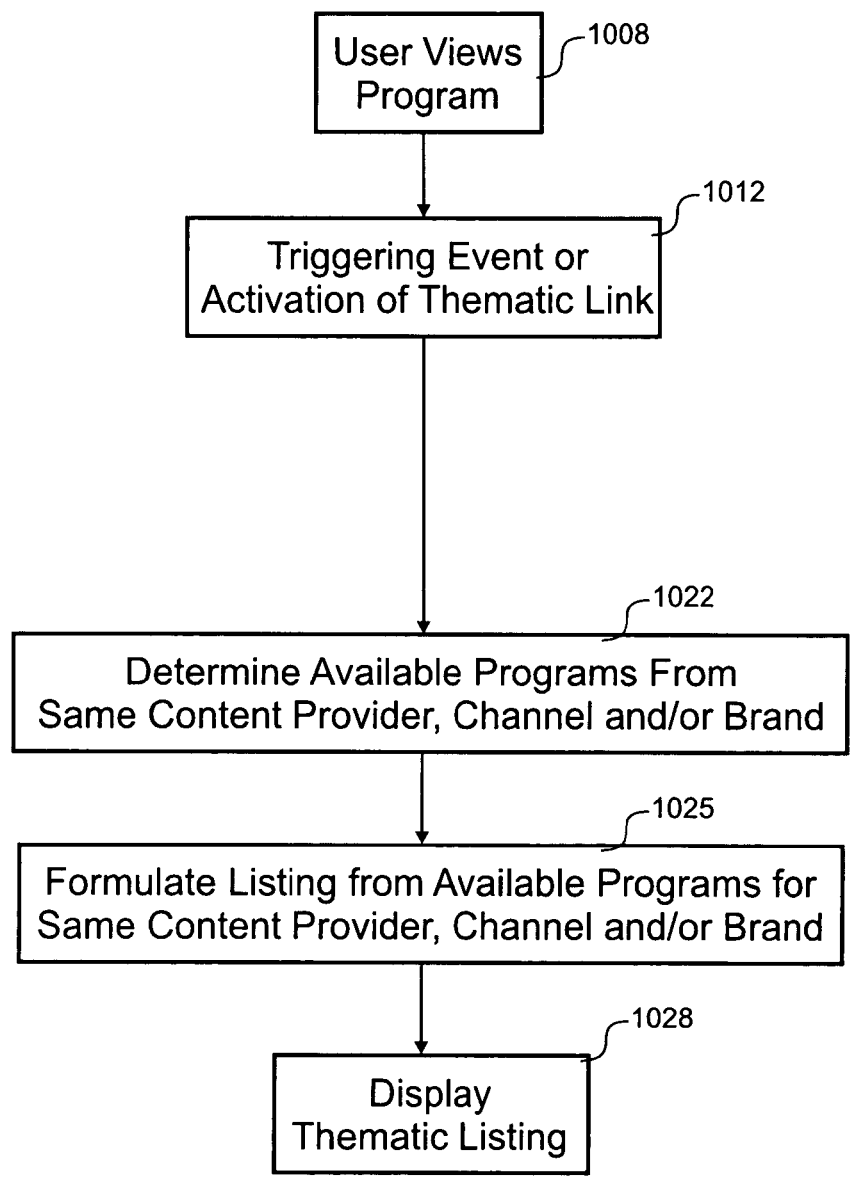

Referring next to FIG. 10C, yet another embodiment 1000-3 of the flow diagram is shown that presents a thematic menu after a triggering event is shown. This embodiment does not gather preference information either manually or automatically. Between steps 1012 and 1028 are new steps 1022 and 1025. In step 1022, the available programs from the same content provider, channel and/or brand are determined. A listing of the available programs is determined in step 1025. The listing may be prioritized in any way the content provider, channel and/or brand wishes.

While the principles of the disclosure have been described above in connection with specific apparatuses and methods, it is to be clearly understood that this description is made only by way of example and not as limitation on the scope of the invention.

What is claimed is:

1. A method for allowing selection of video programs from a program guide presented to a viewer, the method comprising:

presenting with a set-top box at the viewer's location a first program with characterizing identifiers, wherein the first program is provided by a content provider;

determining with the set-top box that a viewer is likely switching away from the first program or has activated a non-textual thematic link, wherein:

the non-textual thematic link is displayed in overlay fashion with the first program, and the determination of likely switch away from the first program includes one or more of:

determining that viewer has paused or stopped playback, determining that the viewer has switched away from the channel, determining the program has become unavailable, determining there are insufficient digital rights, determining that the viewer has selected fast or slow playback, and/or determining that a commercial break is playing;

determining a plurality of programs with the set-top box;
searching the plurality of programs with the set-top box for one or more alternative programs that have characterizing identifiers similar to the first program, wherein the one or more alternative programs are also provided by the content provider; and
in response to determining that the viewer is likely switching away from the first program or in response to determining that the viewer activated the non-textual thematic link, and without additional input from the viewer, displaying with the set-top box the one or more alternative programs in a menu, which is presented for the viewer.

2. The method for allowing selection of video programs from the program guide presented to the viewer as recited in claim 1, further comprising culling the one or more programs with the set-top box based upon viewer preferences.

3. The method for allowing selection of video programs from the program guide presented to the viewer as recited in claim 1, further comprising culling the one or more programs with the set-top box based upon viewer preferences that are automatically gathered.

4. The method for allowing selection of video programs from the program guide presented to the viewer as recited in claim 1, further comprising receiving at the set-top box from the viewer an indicator of the characterizing identifiers that are relevant.

5. The method for allowing selection of video programs from the program guide presented to the viewer as recited in claim 1, wherein the characterizing identifier is a content provider name.

6. The method for allowing selection of video programs from the program guide presented to the viewer as recited in claim 1, wherein the characterizing identifier is a channel.

7. The method for allowing selection of video programs from the program guide presented to the viewer as recited in claim 1, wherein the non-textual thematic link is displayed and selectable by the viewer.

8. A computer-readable and non-transitory medium having computer-executable instructions for performing the computer-implementable method for allowing selection of video programs from a program guide presented to a viewer of claim 1.

9. A method for allowing selection of video programs from a program guide presented to a viewer, the method comprising:
receiving at a set-top box at the viewer's location selection of a first program by a viewer, wherein the first program is provided by a content provider;
presenting with the set-top box the first program with characterizing identifiers;
determining with the set-top box that the viewer is likely switching away from the first program, wherein the determination of likely switch away from the first program includes one or more of:
determining that viewer has paused or stopped playback,
determining that the viewer has switched away from the channel,
determining the program has become unavailable,
determining there are insufficient digital rights,
determining that the viewer has selected fast or slow playback, and/or
determining that a commercial break is playing;
determining a plurality of programs with the set-top box;
searching the plurality of programs with the set-top box for one or more alternative programs that have characterizing identifiers similar to the first program, wherein the one or more alternative programs are also provided by the content provider; and
in response to determining that the viewer is likely switching away from the first program and without additional input from the viewer, displaying with the set-top box the one or more alternative programs in a menu, which is presented for the viewer.

10. The method for allowing selection of video programs from the program guide presented to the viewer as recited in claim 9, wherein the characterizing identifiers include one or more the following: genre, style, mood, program length, content rating, language, reviewer ranking, availability of subtitles or closed captioning, actors, directors, studios, release year, first run or repeat, cost of the view, or content provider category.

11. The method for allowing selection of video programs from the program guide presented to the viewer as recited in claim 9, further comprising culling the one or more programs with the set-top box based upon viewer preferences.

12. A non-transitory computer-readable medium having computer-executable instructions for performing the computer-implementable method for allowing selection of video programs from a program guide presented to a viewer of claim 9.

13. A method for allowing selection of video programs from a program guide presented to a viewer, the method comprising:
receiving at a set-top box at a viewer's location selection of a first program by a viewer;
presenting with the set-top box the first program with characterizing identifiers;
presenting with the set-top box a non-textual thematic link displayed in overlay fashion with the first program;
detecting a triggering event with the set-top box, wherein detecting the triggering event includes one or more of:
determining that the viewer activated the non-textual thematic link;
determining that viewer has paused or stopped playback,
determining that the viewer has switched away from the channel,
determining the program has become unavailable,
determining there are insufficient digital rights,
determining that the viewer has selected fast or slow playback,
and/or
determining that a commercial break is playing;
retrieving preference information with the set-top box;
determining a plurality of programs with the set-top box;
searching the plurality of programs with the set-top box, without additional input from the viewer, for one or more alternative programs that have characterizing identifiers similar to the first program; and
in response to detecting the triggering event and without additional input from the viewer, displaying with the set-top box the one or more alternative programs in a menu in response to the detecting the triggering event, which is presented for the viewer.

14. A computer-readable and non-transitory medium having computer-executable instructions for performing the computer-implementable method for allowing selection of vide-o programs from a program guide presented to a viewer of claim 13.

* * * * *